(12) United States Patent
Dutta et al.

(10) Patent No.: US 11,711,115 B2
(45) Date of Patent: Jul. 25, 2023

(54) QUASI-CO-LOCATION (QCL) INDICATION FOR MULTI-TRANSMISSION AND RECEPTION POINT (TRP) ENABLED SIDELINK COMMUNICATIONS

(71) Applicant: QUALCOMM Incorporated, San Diego, CA (US)

(72) Inventors: Sourjya Dutta, San Diego, CA (US); Kapil Gulati, Belle Mead, NJ (US); Shuanshuan Wu, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 17/243,296

(22) Filed: Apr. 28, 2021

(65) Prior Publication Data

US 2021/0344380 A1    Nov. 4, 2021

Related U.S. Application Data

(60) Provisional application No. 63/018,414, filed on Apr. 30, 2020.

(51) Int. Cl.
*H04B 7/01* (2006.01)
*H04L 5/00* (2006.01)
(Continued)

(52) U.S. Cl.
CPC .............. *H04B 7/01* (2013.01); *H04L 5/0051* (2013.01); *H04W 4/40* (2018.02);
(Continued)

(58) Field of Classification Search
CPC ........ H04B 7/00; H04B 7/01; H04B 10/0795; H04B 17/24; H04B 17/309; H04L 5/003;
(Continued)

(56) References Cited

U.S. PATENT DOCUMENTS

2014/0328329 A1* 11/2014 Novlan ............. H04W 56/0015
370/336
2018/0206140 A1*  7/2018 Panteleev ............. H04L 5/0053
(Continued)

FOREIGN PATENT DOCUMENTS

EP         4050810      *  5/2022  ........... H04B 7/0408
WO    2020029880 A1       2/2020

OTHER PUBLICATIONS

International Search Report and Written Opinion—PCT/US2021/029968—ISA/EPO—dated Jul. 16, 2021.

*Primary Examiner* — Warner Wong
(74) *Attorney, Agent, or Firm* — Seyfarth Shaw LLP

(57) ABSTRACT

A method of wireless communication by a transmitting sidelink user equipment (UE) determines at least one quasi-co-location (QCL) relationship between antenna ports of the transmitting sidelink UE. The QCL relationship corresponds to carrier frequency offset (CFO), average delay, delay spread, Doppler shift, and/or Doppler spread across the antenna ports of the transmitting sidelink UE. Each port maps to a different transmission and reception point (TRP). The method also indicates the QCL relationship(s) to a receiving sidelink UE. A method of wireless communication by a receiving sidelink UE receives a message from TRPs of a transmitting sidelink UE. The message indicates a QCL assumption for the TRPs. The method also individually measures reference signals received from each transmission port of the TRPs. The method may also determine whether signaling from the TRPs satisfies all conditions for the QCL assumption, and report to the transmitting sidelink UE a result of the determining.

26 Claims, 9 Drawing Sheets

(51) Int. Cl.
*H04W 72/0453* (2023.01)
*H04W 4/40* (2018.01)
*H04W 72/20* (2023.01)
*H04W 24/10* (2009.01)
*H04L 43/08* (2022.01)
*H04B 17/309* (2015.01)
*H04B 10/079* (2013.01)

(52) U.S. Cl.
CPC ....... *H04W 72/0453* (2013.01); *H04W 72/20* (2023.01); *H04B 10/0795* (2013.01); *H04B 17/309* (2015.01); *H04L 43/08* (2013.01); *H04W 24/10* (2013.01)

(58) Field of Classification Search
CPC ..... H04L 5/0048; H04L 5/0051; H04L 43/00; H04L 43/08; H04L 43/10; H04W 72/04; H04W 72/044; H04W 72/0453; H04W 4/30; H04W 4/40; H04W 72/0406; H04W 24/00; H04W 24/10; H04W 28/0875; H04W 4/70
See application file for complete search history.

(56) References Cited

U.S. PATENT DOCUMENTS

| | | | |
|---|---|---|---|
| 2018/0376471 A1* | 12/2018 | Chae | H04W 72/1215 |
| 2019/0116467 A1* | 4/2019 | Belleschi | H04W 76/27 |
| 2019/0141691 A1* | 5/2019 | Kwon | H04W 72/12 |
| 2019/0373602 A1* | 12/2019 | Qin | H04L 5/0051 |
| 2020/0106588 A1 | 4/2020 | Gulati et al. | |
| 2020/0145867 A1* | 5/2020 | Tseng | H04W 48/16 |
| 2020/0280483 A1* | 9/2020 | Zhang | H04B 7/08 |
| 2020/0304253 A1 | 9/2020 | Choi et al. | |
| 2020/0413374 A1* | 12/2020 | Luo | H04B 7/0639 |
| 2020/0413391 A1* | 12/2020 | Luo | H04W 76/14 |
| 2021/0044403 A1* | 2/2021 | Zhang | H04L 5/0053 |
| 2021/0160804 A1* | 5/2021 | Akkarakaran | H04W 72/51 |
| 2021/0377768 A1* | 12/2021 | Dutta | H04L 5/0051 |
| 2022/0210779 A1* | 6/2022 | Shin | H04L 5/0051 |
| 2022/0330042 A1* | 10/2022 | Liu | H04L 5/0035 |

\* cited by examiner

QUASI-CO-LOCATION (QCL) INDICATION FOR MULTI-TRANSMISSION AND RECEPTION POINT (TRP) ENABLED SIDELINK COMMUNICATIONS

CROSS-REFERENCE TO RELATED APPLICATION

The present application claims the benefit of U.S. Provisional Patent Application No. 63/018,414, filed on Apr. 30, 2020, and titled "QUASI-CO-LOCATION (QCL) INDICATION FOR MULTI-TRANSMISSION AND RECEPTION POINT (TRP) ENABLED SIDELINK COMMUNICATIONS," the disclosure of which is expressly incorporated by reference in its entirety.

FIELD OF THE DISCLOSURE

Aspects of the present disclosure generally relate to wireless communications, and more particularly to techniques and apparatuses for new radio (NR) vehicle-to-everything (V2X) communications incorporating a quasi-co-location (QCL) indication for multi-transmission and reception point (TRP) enabled sidelink communications.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the fourth generation (4G) long term evolution (LTE) standard. There exists a need for further improvements in 5G NR technology. These improvements may also be applicable to other multi-access technologies and the telecommunications standards that employ these technologies.

Wireless communications systems may include or provide support for various types of communications systems, such as vehicle related communications systems (e.g., vehicle-to-everything (V2X) communications systems). Vehicle related communications systems may be used by vehicles to increase safety and to help prevent collisions of vehicles. Information regarding inclement weather, nearby accidents, road conditions, and/or other information may be conveyed to a driver via the vehicle related communications system. In some cases, vehicles may communicate directly with each other using device-to-device (D2D) communications over a D2D wireless link.

As the demands for vehicle related communications increase, different V2X communications systems compete for the same wireless communications resources. Accordingly, there is a need to improve the sharing of wireless communications resources.

SUMMARY

In some aspects of the present disclosure, a method of wireless communication by a transmitting sidelink user equipment (UE) includes determining one or more quasi-co-location (QCL) relationships between antenna ports of the transmitting sidelink UE. The QCL relationship(s) corresponds to carrier frequency offset (CFO), average delay, delay spread, Doppler shift, and/or Doppler spread across the antenna ports of the transmitting sidelink UE. Each port maps to a different transmission and reception point (TRP). The method also includes indicating the QCL relationship(s) to a receiving sidelink UE.

In other aspects of the present disclosure, a method of wireless communication by a receiving sidelink user equipment (UE) includes receiving a message from multiple transmission and reception points (TRPs) of a transmitting sidelink UE. The message indicates a quasi-co-location (QCL) assumption for the TRPs. The method further includes individually measuring reference signals received from each transmission port of the multiple TRPs. The method further includes determining whether signaling from the TRPs satisfies all conditions for the QCL assumption. The method also includes reporting to the transmitting sidelink UE a result of the determining.

Other aspects of the present disclosure are directed to an apparatus for wireless communications by a transmitting sidelink user equipment (UE) having one or more processors, memory coupled with the processor(s), and instructions stored in the memory. When the instructions are executed by the processor(s), the instructions will cause the apparatus to determine one or more quasi-co-location (QCL) relationships between antenna ports of the transmitting sidelink UE. The QCL relationship(s) correspond to carrier frequency offset (CFO), average delay, delay spread, Doppler shift, and/or Doppler spread across the antenna ports of the transmitting sidelink UE. Each port maps to a different transmission and reception point (TRP). When the instructions are executed by the processor(s), it will also cause the apparatus to indicate the QCL relationship(s) to a receiving sidelink UE.

Other aspects of the present disclosure are directed to an apparatus for wireless communications by a receiving sidelink user equipment (UE) having one or more processor(s), memory coupled with the processor(s), and instructions stored in the memory. When the instructions are executed by the processor(s), the instructions will cause the apparatus to receive a message from multiple transmission and reception points (TRPs) of a transmitting sidelink UE. The message indicates a quasi-co-location (QCL) assumption for the TRPs. The instructions will further cause the apparatus to individually measure reference signals received from each transmission port of the TRPs, to determine whether signaling from the TRPs satisfies all conditions for the QCL assumption, and to report to the transmitting sidelink UE a result of the determining.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
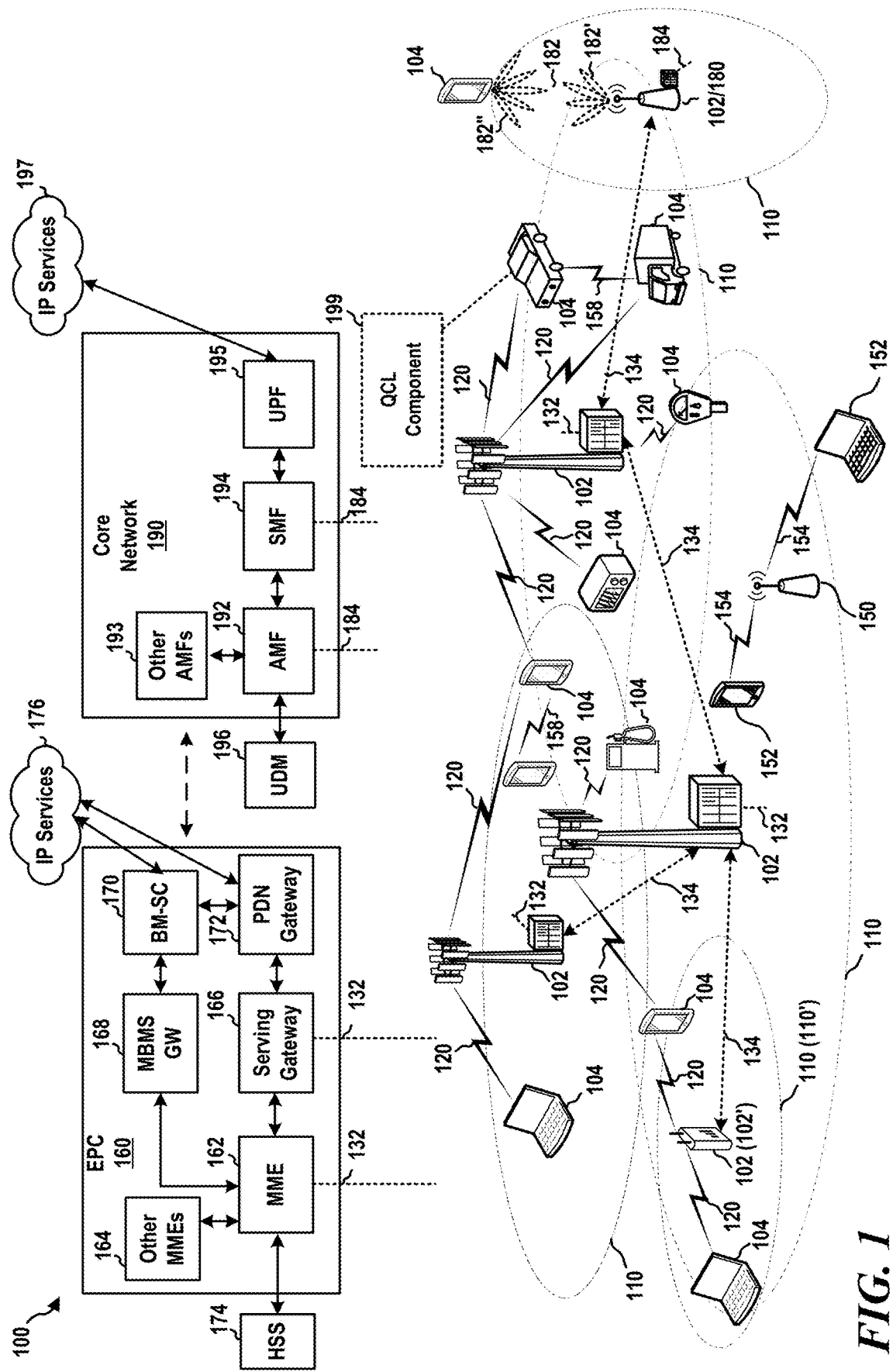
FIG. 1 is a diagram illustrating an example of a wireless communications system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In cellular communications networks, wireless devices may generally communicate with each other via one or more network entities such as a base station or scheduling entity. Some networks, however, may support device-to-device (D2D) communications that enable discovery of, and communications with nearby devices using a direct link between devices (e.g., without passing through a base station, relay, or another node). D2D communications can enable mesh networks and device-to-network relay functionality. Some examples of D2D technology include Bluetooth pairing, Wi-Fi Direct, Miracast, and LTE-D. D2D communications may also be referred to as point-to-point (P2P) or sidelink communications.

D2D communications may be implemented using licensed or unlicensed bands. Additionally, D2D communications can avoid the overhead involving the routing to and from the base station. Therefore, D2D communications may improve throughput, reduce latency, and/or increase energy efficiency.

A type of D2D communications may include vehicle-to-everything (V2X) communications. V2X communications may assist autonomous vehicles in communicating with each other. For example, autonomous vehicles may include multiple sensors (e.g., light detection and ranging (LiDAR), radar, cameras, etc.). In most cases, the autonomous vehicles' sensors are line of sight (LoS) sensors. In contrast, V2X communications may allow autonomous vehicles to communicate with each other for non-line of sight (NLoS) situations.

Sidelink UEs, such as vehicles, may have two or more transmission and reception points (TRPs). For example, a car may have front and rear antenna panels, and larger vehicles (e.g., trucks and trailers) may have multiple TRPs (mTRPs). The TRPs on the same vehicle will have separation between front and rear panels. For example, front and rear panels on a car may be separated by three to four meters, while a sixteen-wheeler trailer may have a front and rear panel separation of approximately twenty meters.

The multiple TRP (mTRP) transmissions when received at the receiver may exhibit different carrier frequency offset (CFO) and Doppler shift/spreads from each of the TRPs. For example, a line-of-sight (LoS) signal channel may exist with respect to one TRP and a non-line-of-sight (NLoS) signal channel may be present with respect to the other TRP.

When a transmitter sidelink user equipment (UE) is transmitting using the two or more TRPs, it is beneficial for the receiving sidelink UE to know the quasi-co-location (QCL) status of mTRPs with respect to CFO and Doppler conditions. Aspects of the present disclosure enable identification and indication of QCL status with respect to CFO, average delay, delay spread, and Doppler shift/spread for mTRP sidelink transmissions. That is, techniques according to aspects of the present disclosure determine whether ports of an mTRP are quasi-located with respect to Doppler characteristics, delay characteristics, and CFO.

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (e.g., a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (e.g., Si interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMES 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmission and reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a sidelink UE, such as the UE 104, may determine at least one quasi-co-location (QCL) relationship between antenna ports of the transmitting sidelink UE. The QCL relationship corresponds to carrier frequency offset (CFO), Doppler shift, and/or Doppler spread across the antenna ports of the transmitting sidelink UE. Each port maps to a different transmission and reception point (TRP). The UE may also indicate the at least one QCL relationship to a receiving sidelink UE. The receiving sidelink UE may receive a message from a group of transmission and reception points (TRPs) of a transmitting sidelink UE. The message indicates a quasi-co-location (QCL) assumption for the TRPs. The receiving sidelink UE also measures reference signals received from each transmission port of the TRPs, individually. The receiving sidelink UE determines whether signaling from the TRPs satisfies at least one condition confirming the QCL assumption; and reports to the transmitting sidelink UE a result of the determining. The UE 104 may include a QCL component 199 configured to perform these steps.

Although the following description may be focused on 5G NR, the described techniques may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communications technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 2µ slots/subframe. The subcarrier spacing and symbol length/duration are a function of the numerology. The subcarrier spacing may be equal to 2^µ*15 kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/negative acknowledgement (NACK) feedback. The PUSCH carries data, and may additionally be used to carry a buffer status report (BSR), a power headroom report (PHR), and/or UCI.

Figure 3:
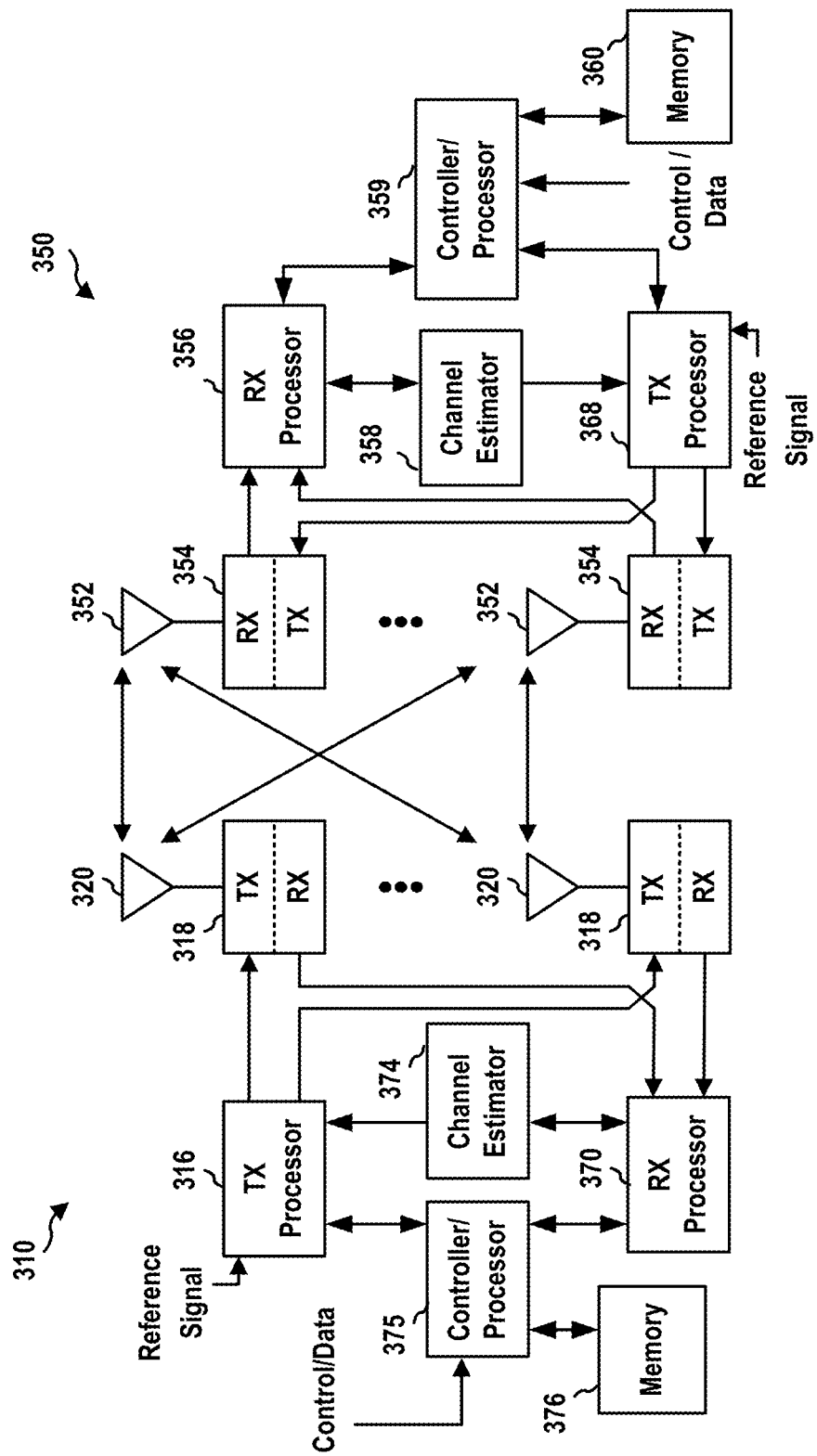
FIG. 3 is a block diagram illustrating an example of a base station in communication with a user equipment (UE) in an access network.

FIG. 3 is a block diagram illustrating an example of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, the UE 350 may include means for determining, means for indicating, means for updating, means for retransmitting, means for receiving, means for informing, means for transmitting, means for ignoring, means for sending, means for reporting, and means for measuring. Such means may include one or more components of the UE 350 described in connection with FIG. 3.

At least one of the TX processor 368, the RX processor 356, and the controller/processor 359 may be configured to perform aspects in connection with the QCL component 199 of FIG. 1. The QCL component 199 may determine one or more quasi-co-location (QCL) relationships between antenna ports of the transmitting sidelink UE. The QCL relationship(s) corresponds to carrier frequency offset (CFO), average delay, delay spread, Doppler shift, and/or Doppler spread across the antenna ports of the transmitting sidelink UE. Each port maps to a different transmission and reception point (TRP) of multiple TRPs. The QCL component 199 may also indicate the QCL relationships to a receiving sidelink UE. In other aspects, the QCL component 199 may receiving a message from multiple transmission and reception points (TRPs) of a transmitting sidelink UE. The message indicates a quasi-co-location (QCL) assumption for the TRPs. The QCL component 199 may individually measure reference signals received from each transmission port of the TRPs. The QCL component 199 may determine whether signaling from the TRPs satisfies all conditions for the QCL assumption; and may report to the transmitting sidelink UE a result of the determining.

Figure 4:
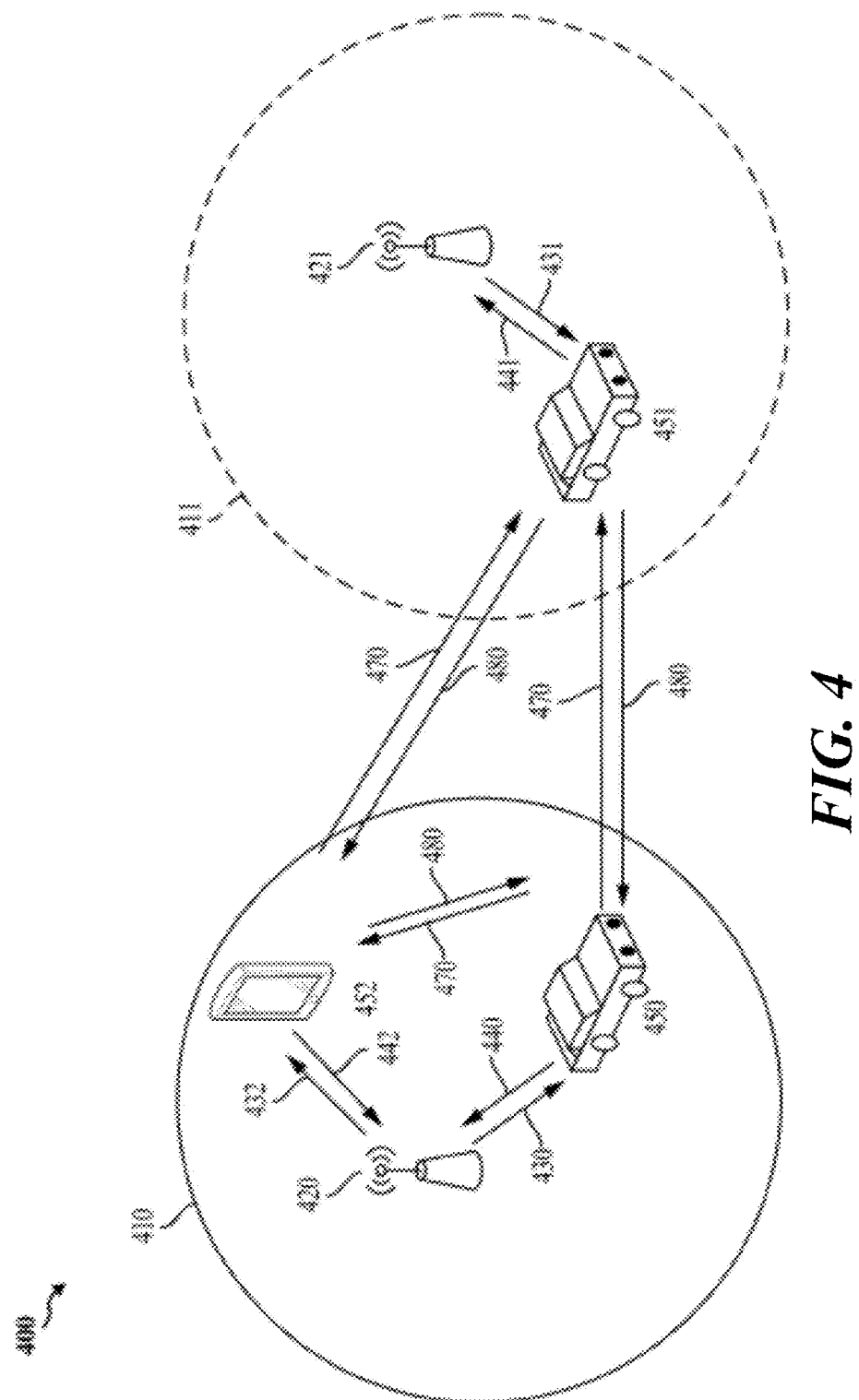
FIG. 4 is a diagram illustrating an example of a device-to-device (D2D) communications system, including vehicle-to-everything (V2X) communications, in accordance with various aspects of the present disclosure.

FIG. 4 is a diagram illustrating an example of a device-to-device (D2D) communications system 400, including V2X communications, in accordance with various aspects of the present disclosure. For example, the D2D communications system 400 may include V2X communications, (e.g., a first UE 450 communicating with a second UE 451). In some aspects, the first UE 450 and/or the second UE 451 may be configured to communicate in a licensed radio frequency spectrum and/or a shared radio frequency spectrum. The shared radio frequency spectrum may be unlicensed, and therefore multiple different technologies may use the shared radio frequency spectrum for communications, including new radio (NR), LTE, LTE-Advanced, licensed assisted access (LAA), dedicated short range communications (DSRC), MuLTEFire, 4G, and the like. The foregoing list of technologies is to be regarded as illustrative, and is not meant to be exhaustive.

The D2D communications system 400 may use NR radio access technology. Of course, other radio access technologies, such as LTE radio access technology, may be used. In D2D communications (e.g., V2X communications or vehicle-to-vehicle (V2V) communications), the UEs 450, 451 may be on networks of different mobile network operators (MNOs). Each of the networks may operate in its own radio frequency spectrum. For example, the air interface to a first UE 450 (e.g., Uu interface) may be on one or more frequency bands different from the air interface of the second UE 451. The first UE 450 and the second UE 451 may communicate via a sidelink component carrier, for example, via the PC5 interface. In some examples, the MNOs may schedule sidelink communications between or among the UEs 450, 451 in licensed radio frequency spectrum and/or a shared radio frequency spectrum (e.g., 5 GHz radio spectrum bands).

The shared radio frequency spectrum may be unlicensed, and therefore different technologies may use the shared radio frequency spectrum for communications. In some aspects, a D2D communications (e.g., sidelink communications) between or among UEs 450, 451 is not scheduled by MNOs. The D2D communications system 400 may further include a third UE 452.

The third UE 452 may operate on the first network 410 (e.g., of the first MNO) or another network, for example. The third UE 452 may be in D2D communications with the first UE 450 and/or second UE 451. The first base station 420 (e.g., gNB) may communicate with the third UE 452 via a downlink (DL) carrier 432 and/or an uplink (UL) carrier 442. The DL communications may be use various DL resources (e.g., the DL subframes (FIG. 2A) and/or the DL channels (FIG. 2B)). The UL communications may be performed via the UL carrier 442 using various UL resources (e.g., the UL subframes (FIG. 2C) and the UL channels (FIG. 2D)).

Figure 2:
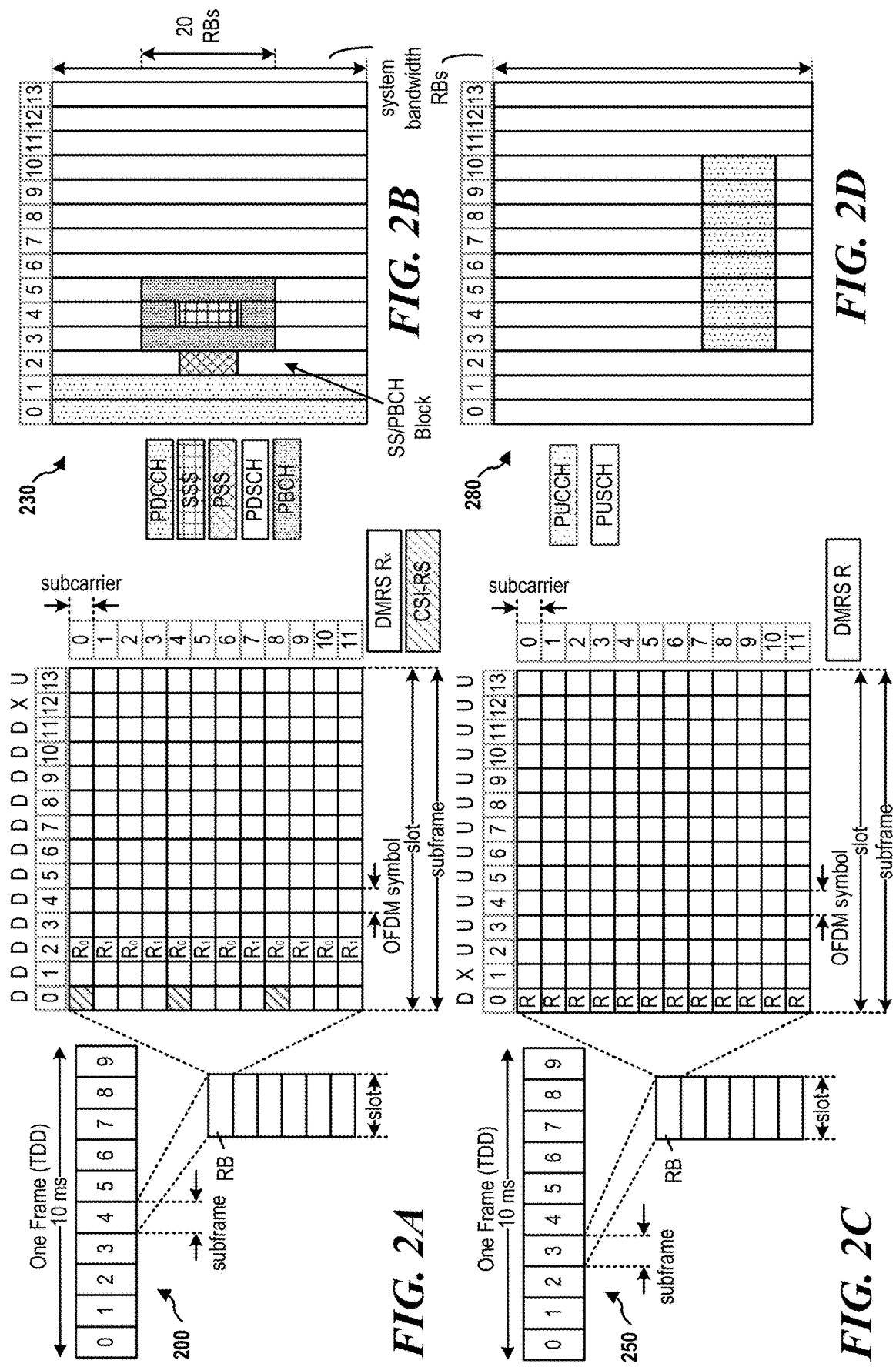
FIGS. 2A, 2B, 2C, and 2D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

The first network 410 operates in a first frequency spectrum and includes the first base station 420 (e.g., gNB) communicating at least with the first UE 450, for example, as described in FIGS. 1-3. The first base station 420 (e.g., gNB) may communicate with the first UE 450 via a DL carrier 430 and/or an UL carrier 440. The DL communications may be use various DL resources (e.g., the DL subframes (FIG. 2A) and/or the DL channels (FIG. 2B)). The UL communications may be performed via the UL carrier 440 using various UL resources (e.g., the UL subframes (FIG. 2C) and the UL channels (FIG. 2D)).

In some aspects, the second UE 451 may be on a different network from the first UE 450. In some aspects, the second UE 451 may be on a second network 411 (e.g., of the second MNO). The second network 411 may operate in a second frequency spectrum (e.g., a second frequency spectrum different from the first frequency spectrum) and may include the second base station 421 (e.g., gNB) communicating with the second UE 451, for example, as described in FIGS. 1-3.

The second base station 421 may communicate with the second UE 451 via a DL carrier 431 and an UL carrier 441. The DL communications are performed via the DL carrier 431 using various DL resources (e.g., the DL subframes (FIG. 2A) and/or the DL channels (FIG. 2B)). The UL communications are performed via the UL carrier 441 using various UL resources (e.g., the UL subframes (FIG. 2C) and/or the UL channels (FIG. 2D)).

In conventional systems, the first base station 420 and/or the second base station 421 assign resources to the UEs for device-to-device (D2D) communications (e.g., V2X communications and/or V2V communications). For example, the resources may be a pool of UL resources, both orthogonal (e.g., one or more FDM channels) and non-orthogonal (e.g., code division multiplexing (CDM)/resource spread multiple access (RSMA) in each channel). The first base station 420 and/or the second base station 421 may configure the resources via the PDCCH (e.g., faster approach) or RRC (e.g., slower approach).

In some systems, each UE 450, 451 autonomously selects resources for D2D communications. For example, each UE 450, 451 may sense and analyze channel occupation during the sensing window. The UEs 450, 451 may use the sensing information to select resources from the sensing window. As discussed, one UE 451 may assist another UE 450 in performing resource selection. The UE 451 providing assistance may be referred to as the receiver UE or partner UE, which may potentially notify the transmitter UE 450. The transmitter UE 450 may transmit information to the receiving UE 451 via sidelink communications.

The D2D communications (e.g., V2X communications and/or V2V communications) may be carried out via one or more sidelink carriers 470, 480. The one or more sidelink carriers 470, 480 may include one or more channels, such as a physical sidelink broadcast channel (PSBCH), a physical sidelink discovery channel (PSDCH), a physical sidelink shared channel (PSSCH), and a physical sidelink control channel (PSCCH), for example.

In some examples, the sidelink carriers 470, 480 may operate using the PC5 interface. The first UE 450 may transmit to one or more (e.g., multiple) devices, including to the second UE 451 via the first sidelink carrier 470. The second UE 451 may transmit to one or more (e.g., multiple) devices, including to the first UE 450 via the second sidelink carrier 480.

In some aspects, the UL carrier 440 and the first sidelink carrier 470 may be aggregated to increase bandwidth. In some aspects, the first sidelink carrier 470 and/or the second sidelink carrier 480 may share the first frequency spectrum (with the first network 410) and/or share the second frequency spectrum (with the second network 411). In some aspects, the sidelink carriers 470, 480 may operate in an unlicensed/shared radio frequency spectrum.

In some aspects, sidelink communications on a sidelink carrier may occur between the first UE 450 and the second UE 451. In an aspect, the first UE 450 may perform sidelink communications with one or more (e.g., multiple) devices, including the second UE 451 via the first sidelink carrier 470. For example, the first UE 450 may transmit a broadcast transmission via the first sidelink carrier 470 to the multiple devices (e.g., the second and third UEs 451, 452). The second UE 451 (e.g., among other UEs) may receive such broadcast transmission. Additionally or alternatively, the first UE 450 may transmit a multicast transmission via the first sidelink carrier 470 to the multiple devices (e.g., the second and third UEs 451, 452). The second UE 451 and/or the third UE 452 (e.g., among other UEs) may receive such multicast transmission. The multicast transmissions may be connectionless or connection-oriented. A multicast transmission may also be referred to as a groupcast transmission.

Furthermore, the first UE 450 may transmit a unicast transmission via the first sidelink carrier 470 to a device, such as the second UE 451. The second UE 451 (e.g., among other UEs) may receive such unicast transmission. Additionally or alternatively, the second UE 451 may perform sidelink communications with one or more (e.g., multiple) devices, including the first UE 450 via the second sidelink carrier 480. For example, the second UE 451 may transmit a broadcast transmission via the second sidelink carrier 480 to the multiple devices. The first UE 450 (e.g., among other UEs) may receive such broadcast transmission.

In another example, the second UE 451 may transmit a multicast transmission via the second sidelink carrier 480 to the multiple devices (e.g., the first and third UEs 450, 452). The first UE 450 and/or the third UE 452 (e.g., among other UEs) may receive such multicast transmission. Further, the second UE 451 may transmit a unicast transmission via the second sidelink carrier 480 to a device, such as the first UE 450. The first UE 450 (e.g., among other UEs) may receive such unicast transmission. The third UE 452 may communicate in a similar manner.

In some aspects, for example, such sidelink communications on a sidelink carrier between the first UE 450 and the second UE 451 may occur without having MNOs allocating resources (e.g., one or more portions of a resource block (RB), slot, frequency band, and/or channel associated with a sidelink carrier 470, 480) for such communications and/or without scheduling such communications. Sidelink communications may include traffic communications (e.g., data communications, control communications, paging communications and/or system information communications). Further, sidelink communications may include sidelink feedback communications associated with traffic communications (e.g., a transmission of feedback information for previously-received traffic communications). Sidelink communications may employ at least one sidelink communications structure having at least one feedback symbol. The feedback symbol of the sidelink communications structure may allot for any sidelink feedback information that may be communicated in the device-to-device (D2D) communications system 400 between devices (e.g., a first UE 450, a second UE 451, and/or a third UE 452). As discussed, a UE may be a vehicle (e.g., UE 450, 451), a mobile device (e.g., 452), or another type of device. In some cases, a UE may be a special UE, such as a road side unit (RSU).

Figure 5:
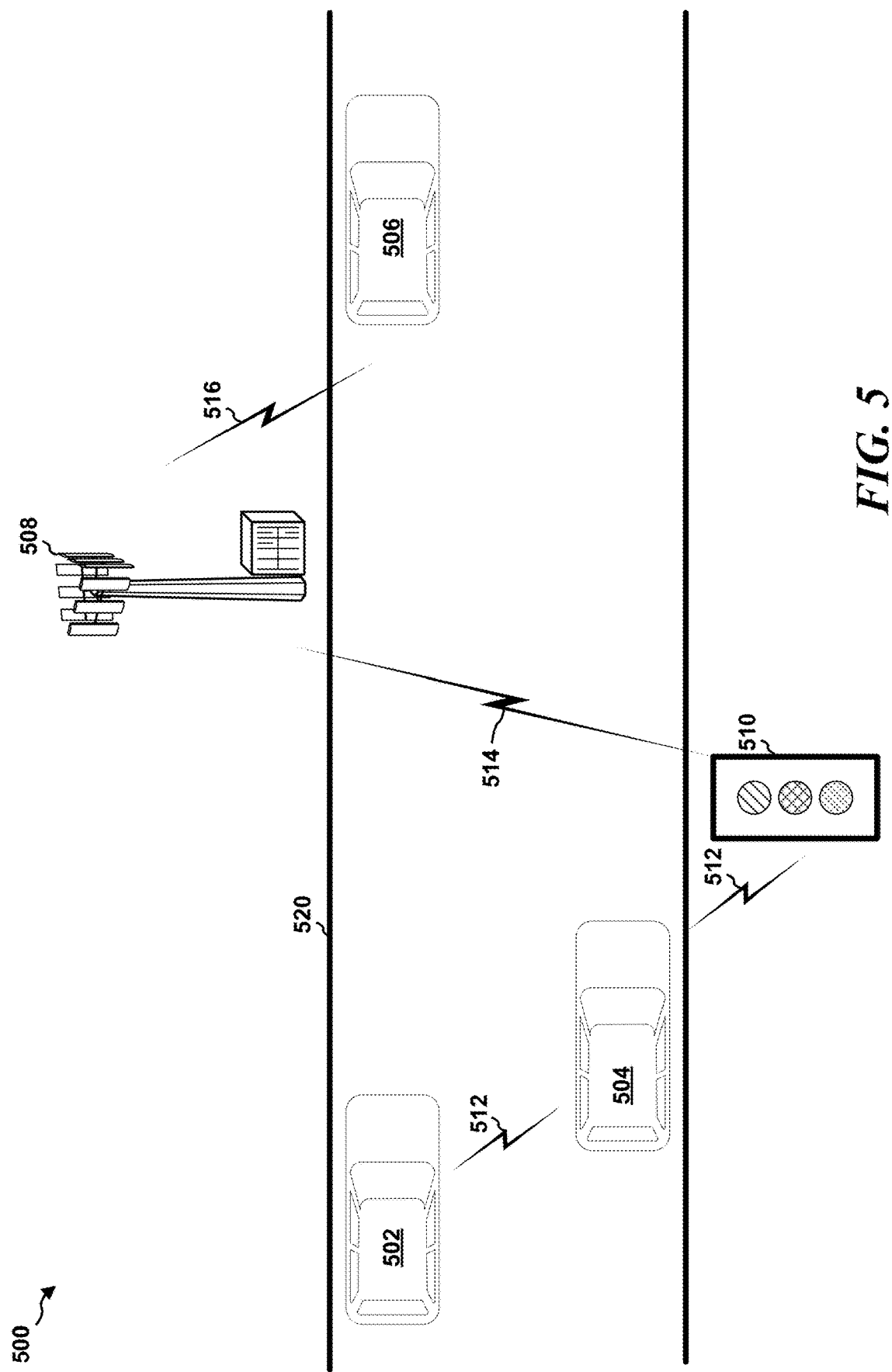
FIG. 5 is a block diagram illustrating an example of a vehicle-to-everything (V2X) system with a road side unit (RSU), according to aspects of the present disclosure.

FIG. 5 is a block diagram illustrating an example of a V2X system 500 with an RSU 510, according to aspects of the present disclosure. As shown in FIG. 5, a transmitter UE 504 transmits data to an RSU 510 and a receiving UE 502 via sidelink transmissions 512. Additionally, or alternatively, the RSU 510 may transmit data to the transmitter UE 504 via a sidelink transmission 512. The RSU 510 may forward data received from the transmitter UE 504 to a cellular network (e.g., gNB) 508 via an UL transmission 514. The gNB 508 may transmit the data received from the RSU 510 to other UEs 506 via a DL transmission 516. The RSU 510 may be incorporated with traffic infrastructure (e.g., traffic light, light pole, etc.) For example, as shown in FIG. 5, the RSU 510 is a traffic signal positioned at a side of a road 520. Additionally or alternatively, RSUs 510 may be stand-alone units.

Sidelink UEs, such as vehicles, may have two or more transmission and reception points (TRPs). For example, a car may have front and rear antenna panels, and larger vehicles (e.g., trucks and trailers) may have mTRPs. The TRPs on the same vehicle will have separation between front and rear panels. For example, front and rear panels on a car may be separated by three to four meters, while a sixteen-wheeler trailer may have a front and rear panel separation of approximately twenty meters.

Figure 6:
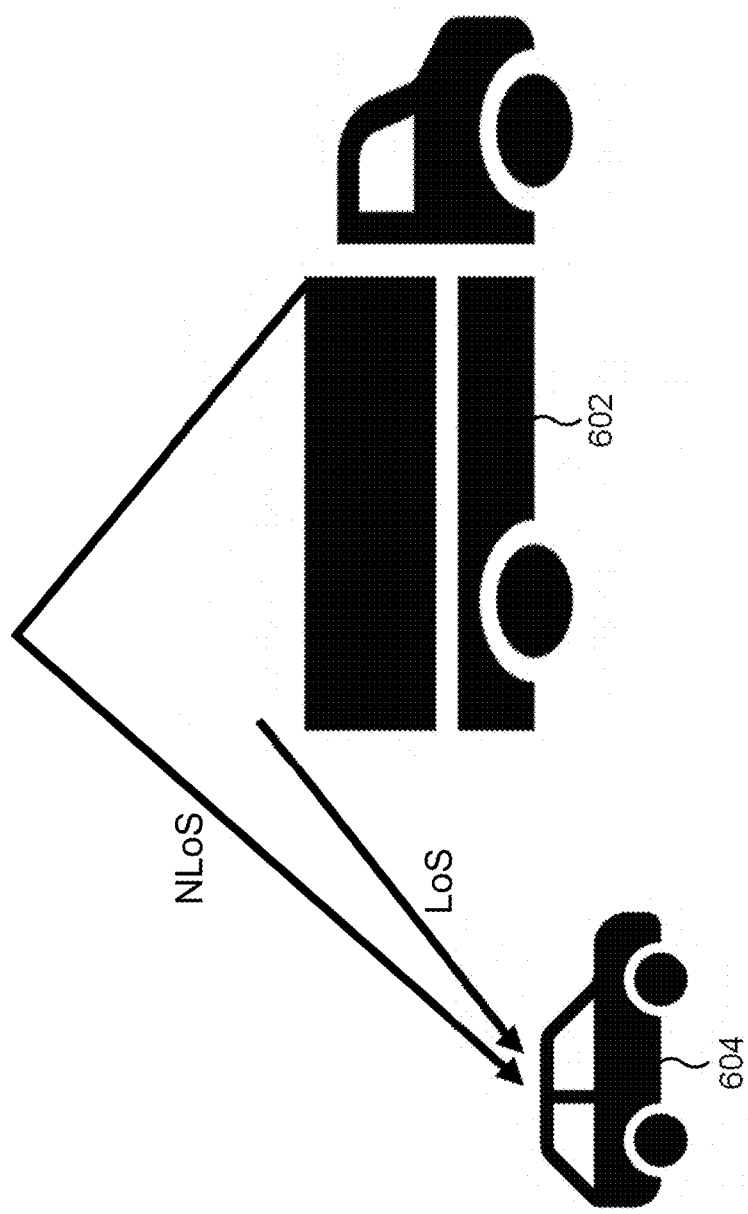
FIG. 6 is a diagram illustrating non-quasi-collocated (QCL) multiple transmit and receive point (mTRP) transmissions, in accordance with various aspects of the present disclosure.

Multiple TRP (mTRP) transmissions, when received at a receiver, may exhibit different carrier frequency offset (CFO,) average delay, delay spread, and/or Doppler shift/spreads from each of the TRPs. On the transmit (TX) side, depending on the architecture, two oscillators driving the intermediate frequency (IF) to radio frequency (RF) (or baseband (BB) to RF) at the TRPs may be disciplined by a different global navigation satellite system (GNSS). In such examples, the CFO (e.g., even the oscillator mean in addition to the phase noise) may not be matched across the TRPs. On the receive (RX) side, due to the close proximity of the sidelink transmitter and receiver, the channel conditions may be largely mismatched. FIG. 6 is a diagram illustrating non-quasi-collocated (QCL) multiple transmit and receive point (mTRP) transmissions, in accordance with various aspects of the present disclosure. FIG. 6 illustrates a line-of-sight (LoS) signal path from one TRP on a truck 602 to a car 604. FIG. 6 also illustrates a non-line-of-sight (NLoS) signal path from the truck 602 to the car 604. As can be seen in FIG. 6, the two signal paths from the truck 602 originate from different locations, for example, the front and rear of the truck.

In some examples, a transmitter sidelink user equipment (UE) is transmitting rank-2 (or rank-3 if polarized multiple-input-multiple-output (MIMO) is used) or higher using the two or more TRPs. In such examples, it is beneficial for the receiving sidelink UE to know the quasi-co-location (QCL) status of multiple data modulation reference signal (DMRS) ports with respect to CFO and Doppler shift. For the present disclosure, assume rank-2 (or higher) transmissions with two (or more) DMRS ports, and each port is mapped to a different TRP. More generally, with a quantity M port transmission using a quantity N TRPs, each of the M ports is mapped to only one of the N TRPs.

Conventionally, for base station to UE communications, a receiving UE may assume QCL with respect to CFO. The receiving UE averages the estimated CFO across the DMRS ports. If the transmit CFO is not the same across all TRPs, or if a line of sight path is present with respect to one TRP and a non-line of sight path is present with respect to the other TRP, then the effective CFO (e.g., TX CFO+Doppler shift) observed on the two ports is different and should not be averaged. Aspects of the present disclosure address this issue and enable identification and indication of QCL status with respect to CFO and Doppler shift/spread for mTRP sidelink transmissions. That is, techniques according to aspects of the present disclosure determine whether ports of an mTRP are quasi-located with respect to Doppler and CFO.

According to aspects of the present disclosure, a transmitter sidelink UE transmits sidelink communications using two or more antenna ports. That is, the transmitter sidelink UE is a multiple transmit and receive point (mTRP). The transmitter sidelink UE indicates one or more QCL relationships across the antenna ports. The QCL relationships may be with respect to CFO, average delay, delay spread, Doppler shift, and/or Doppler spread. In some aspects, the UE transmits the QCL indicator in sidelink control information (SCI) alongside the sidelink data. In other aspects, the UE configures the QCL indicator to the peer UE as a part of radio resource control (RRC) connection setup or modification for the side-link communication link.

According to aspects of the present disclosure, the transmitting (TX) UE determines whether to indicate QCL with respect to CFO, average delay, delay spread, and Doppler shift/spread based on one or more factors. For example, the UE considers a size of the vehicle and TRP placement on the vehicle. A car with a rooftop antenna might be indicated as QCL, whereas a truck with front and back TRPs may be indicated as non-QCL with respect to CFO and Doppler shift. Another factor is a velocity of the transmitting UE. Yet another factor is sensor information shared by a peer and/or location information shared by the peer.

Figure 7:
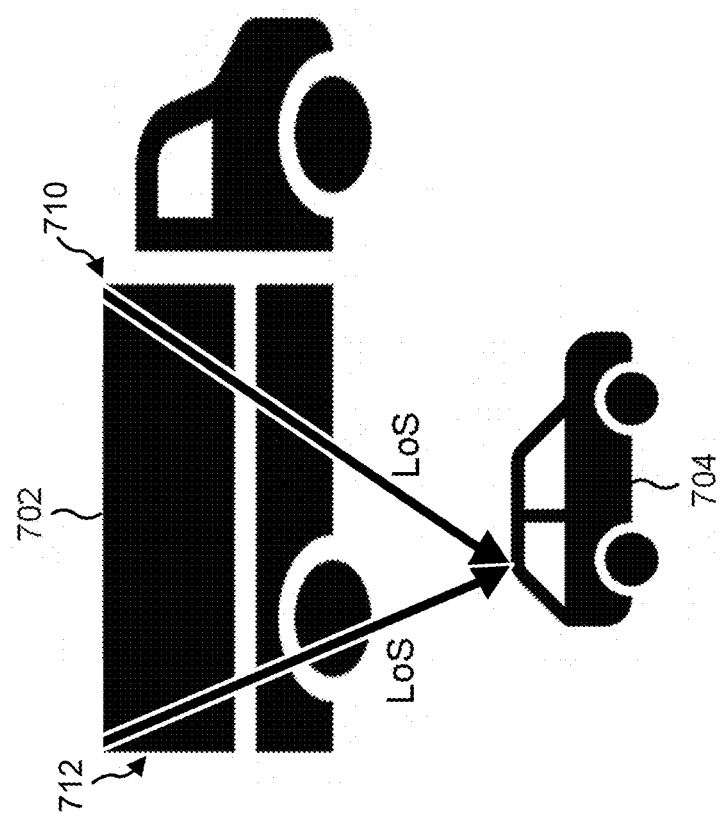
FIG. 7 is a diagram illustrating quasi-collocated (QCL) multiple transmit and receive point (mTRP) transmissions, in accordance with various aspects of the present disclosure.

FIG. 7 is a diagram illustrating QCL mTRP transmissions, in accordance with various aspects of the present disclosure. As seen in FIG. 7, a truck 702 may have a first TRP located at the front, with a line of sight (LoS) path 710 to a receiving UE 704. The truck 702 also has a TRP located at the rear of the trailer with another line of sight (LoS) path 712 to the receiving UE 704. In this example, the TRPs are indicated as having a QCL relationship with respect to Doppler shift/spread, average delay, delay spread, and/or CFO.

The transmitting sidelink UE may determine QCL in other ways, as well. For example, if the UE receives a negative acknowledgment (NACK) ( ) from a peer(s), the transmitting UE may try to retransmit the message with the same QCL assumption until success or a maximum number of failures occurs. This is the default when no QCL indication is configured initially. In other aspects, the transmitting UE updates the QCL information and re-transmits the message with the updated QCL relationship. The transmitting UE updates the QCL assumption based on current sensor information (e.g., about location, speed, etc.), or for example, based on a channel estimate. As a result of the update, in one example, the UE indicates a QCL relationship for CFO, but indicates a non-QCL relationship for Doppler shift and Doppler spread. The UE may update the QCL information using control information sent with the data or with a radio resource control (RRC) reconfiguration message. The updated QCL relationship may be no QCL relationship, in some examples.

If a dedicated link exists between the sidelink UEs, additional options are available for the transmitting UE to determine the QCL relationship. For example, with unicast/multicast transmissions, the determination of the QCL relationship may be based on, in addition to pre-configured or sensor information, configuration information transmitted to the receiving UE by the multi-TRP UE. The configured information may be, for example, measurements of a distance between the TRPs or a position of the TRPs, such as front and rear of the vehicle, left side and right side of the vehicle, etc. To configure this information, the mTRP enabled UE may indicate that it is mTRP enabled in RRC connection setup/update messages. Along with this, the mTRP enabled UE sends an estimated QCL type, which can indicate no collocation as well (e.g., no QCL relationship). The transmitting UE also sends a list of reference signals (RS) for measurements, for each of the TRPs.

According to aspects of the present disclosure, the receiving UE measures the designated reference signals and sends a channel quality report or measurement report back to the transmitting UE based on the indicated QCL assumption. If the transmitting UE determines that the QCL assumption was correct, the transmitting UE then transmits with the same set of RSs. Alternatively, the transmitting UE may determine the QCL assumption to be wrong, and then transmits an RRC connection update with updated QCL information based on measurements.

For example, an mTRP capable UE may instruct the peers not to consider QCL for its two transmitters. The connection setup message includes a list of RSs for each of the ports to be measured (e.g., a channel state information reference signal (CSI-RS)). The peers measure the CSI-RS reference signals and provide feedback including the channel quality indicator (CQI) to the transmitting UE. Based on this CQI, the mTRP enabled UE determines whether the channel from each TRP is distinct for the peer UE (or group). If the two transmitters are determined to be quasi-collocated, the mTRP enabled UE may send the updated QCL information to the peers (along with the RS). Similarly, if the transmitting UE initially indicates that a QCL relationship exists, and the feedback from the peers indicates otherwise, the transmitting UE will update the QCL assumption accordingly.

The receiving sidelink UE can also be improved when a dedicated channel exists (e.g., for unicast/groupcast communications) and the transmitting UE indicates the TRPs are quasi-co-located. According to aspects of the present disclosure, the receiving UE may use the QCL information, as is, for decoding received signals. In other aspects, the receiving UE will first measure the RSs received from the transmit ports individually. The UE can measure reference signal received power (RSRP), CFO, Doppler spread, etc. The receiving UE may then determine, using a pre-configured threshold, whether the signals can be treated as quasi-co-located. For example, for a two-TRP transmitter, the receiving UE may determine that (a) $RSRP_1 > Thresh*RSRP_2$ (RSRP threshold); (b) $\Delta f_1$ (carrier offset1)$>\Delta f_2$ (carrier offset2)$+\theta_{Thresh}$ (carrier offset threshold); or (c) $\tau_1$ (delay1)$>\tau_2$ (delay2)$+\delta\tau$ (delay threshold).

If some or all of the conditions for the non-QCL assumption are satisfied for the receiving UE, in the channel state indication (CSI) (e.g., CQI report) to the transmitting UE, the receiving UE may include a QCL indicator (QCL-I) as a CSI-parameter. The QCL-I may list the pairs or groups of transmitters from the transmitting UE that may not be quasi-co-located. Additionally, based on the receiving UE's measurements, the receiving UE may also include possible reasons for the non-QCL determination (e.g., delay, Doppler spread, CFO, spatial mismatch, etc.). In one aspect, all conditions should be satisfied for the QCL assumption. If any one of the conditions is incorrect, the QCL relation is modified.

The transmitting UE, upon receiving the QCL-I, may ignore it and continue to use its own QCL assumption. Thus, this feature is backward compatible. Alternatively, the transmitting UE may update information for the receiving UE (or group of receiving UEs) and send an RRC connection update with a modified QCL-type. In some cases, the update may indicate no QCL relationship.

As indicated above, FIGS. 6-7 are provided as examples. Other examples may differ from what is described with respect to FIGS. 6-7.

Figure 8:
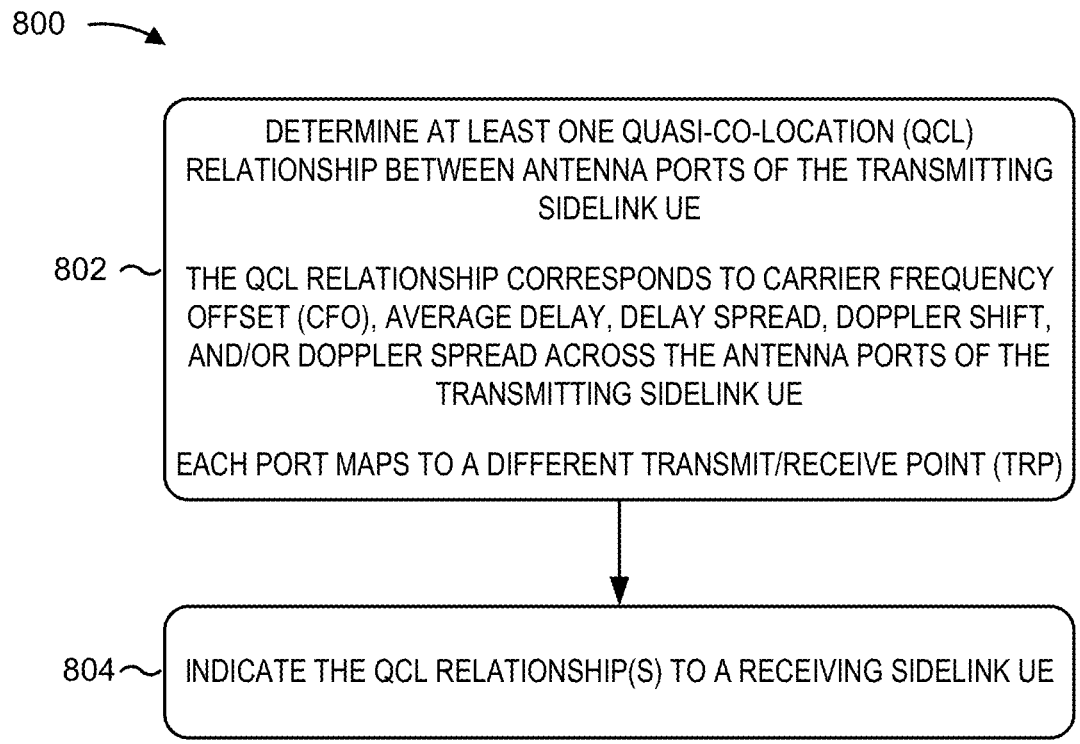
FIG. 8 is a flow diagram illustrating an example process performed, for example, by a transmitting sidelink user equipment (UE), in accordance with various aspects of the present disclosure.

FIG. 8 is flow diagram illustrating an example process 800 performed, for example, by a transmitting sidelink user equipment (UE), in accordance with various aspects of the present disclosure. The example process 800 is an example of quasi-co-location (QCL) indication for multi-transmission and reception point (TRP) enabled sidelink communications.

As shown in FIG. 8, in some aspects, the process 800 may include determining at least one quasi-co-location (QCL) relationship between antenna ports of the transmitting sidelink UE (block 802). For example, the UE (e.g., using the antenna 352, RX/TX 354, RX processor 356, controller processor 359, and/or memory 360) may determine the QCL relationship. The QCL relationship may be determined based on carrier frequency offset (CFO), average delay, delay spread, Doppler shift, and/or Doppler spread across the antenna ports of the transmitting sidelink UE. In other aspects, the QCL relationship may be determined based on preconfigured information, such as a distance between TRPs or positioning of the TRPs. In still other aspects, the QCL relationship may be determined based on a velocity of the TRPs. In still other aspects, the UE may determine the QCL relationship based on sensor information or location information received from the receiver sidelink UE.

As shown in FIG. 8, in some aspects, the process 800 may include indicating the at least one QCL relationship to a receiving sidelink UE (block 804). For example, the UE (e.g., using the antenna 352, TX/RX 354, TX processor 368, controller processor 359, and/or memory 360) may indicate the QCL relationship. The UE may indicate the QCL relationship via sidelink control information or via RRC signaling.

Figure 9:
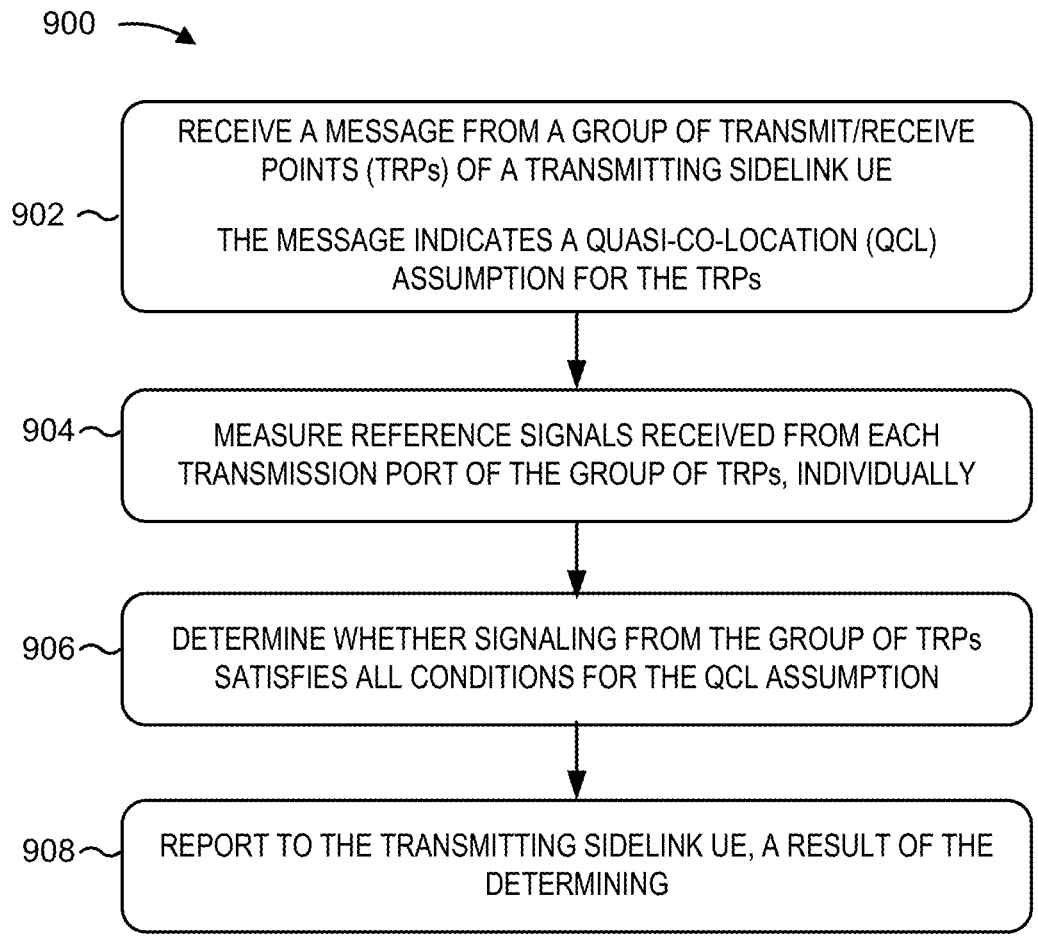
FIG. 9 is a flow diagram illustrating an example process performed, for example, by a receiving sidelink user equipment (UE), in accordance with various aspects of the present disclosure.

FIG. 9 is a flow diagram illustrating an example process 900 performed, for example, by a receiving sidelink user equipment (UE), in accordance with various aspects of the present disclosure. The example process 900 is an example of quasi-co-location (QCL) indication for multi-transmission and reception point (TRP) enabled sidelink communications.

As shown in FIG. 9, in some aspects, the process 900 may include receiving a message from a group of transmission and reception points (TRPs) of a transmitting sidelink UE. The message indicates a quasi-co-location (QCL) assumption for the TRPs (block 902). For example, the UE (e.g., using the antenna 352, RX/TX 354, RX processor 356, controller processor 359, and/or memory 360) may receive the message.

As seen in FIG. 9, in some aspects, the process 900 may include measuring reference signals received from each transmission port of the group of TRPs, individually (block 904). For example, the UE (e.g., using the antenna 352, RX/TX 354, RX processor 356, controller processor 359, and/or memory 360) may measure the reference signals. The UE may measure reference signal received power (RSRP), CFO, Doppler spread, etc.

As shown in FIG. 9, in some aspects, the process 900 may include determining whether signaling from the group of TRPs satisfies all conditions for the QCL assumption (block 906). For example, the UE (e.g., using the antenna 352, RX/TX 354, 368, RX processor 356, controller processor 359, and/or memory 360) may determine whether signaling from the group of TRPs satisfies the condition. For a two-TRP transmitter, the receiving UE may determine that (a) $RSRP_1 > Thresh \ast RSRP_2$ (RSRP threshold); (b) $\Delta f_1$ (carrier offset1)$>\Delta f_2$ (carrier offset2)$+\theta_{Thresh}$ (carrier offset threshold); or (c) $\tau_1$ (delay1)$>\tau_2$ (delay2)$+\delta\tau$ (delay threshold).

As shown in FIG. 9, in some aspects, the process 900 may include reporting to the transmitting sidelink UE a result of the determining (block 908). For example, the UE (e.g., using the antenna 352, RX/TX 354, TX processor 368, controller processor 359, and/or memory 360) may report to the transmitting sidelink UE. If some or all of the conditions for the non-QCL assumption are satisfied for the receiving UE, in the channel state indication (CSI), the receiving UE may include a QCL indicator (QCL-I) as a CSI-parameter. The QCL-I may list the pairs or groups of transmitters from the transmitting UE that may not be quasi-co-located. Additionally, based on the receiving UE's measurements, the receiving UE may also include possible reasons for the non-QCL determination (e.g., delay, Doppler spread, CFO, spatial mismatch, etc.).

Implementation examples are described in the following numbered clauses.

1. A method of wireless communication by a transmitting sidelink user equipment (UE), comprising:
    determining at least one quasi-co-location (QCL) relationship between antenna ports of the transmitting sidelink UE, the at least one QCL relationship corresponding to carrier frequency offset (CFO), average delay, delay spread, Doppler shift, and/or Doppler spread across the antenna ports of the transmitting sidelink UE, each port mapping to a different transmission and reception point (TRP) of a plurality of TRPs; and
    indicating the at least one QCL relationship to a receiving sidelink UE.
2. The method of clause 1, further comprising indicating via sidelink control information (SCI).
3. The method of clause 1 or 2, further comprising indicating during a radio resource control (RRC) connection setup or modification procedure for a sidelink communications link established between the receiving sidelink UE and the transmitting sidelink UE.
4. The method of any of the preceding clauses, further comprising determining the at least one QCL relationship based on preconfigured information about the plurality of TRPs.
5. The method of any of the preceding clauses, further comprising determining the at least one QCL relationship based on a velocity of the plurality of TRPs.
6. The method of any of the preceding clauses, further comprising determining the at least one QCL relationship based on sensor information and/or location information received from the receiving sidelink UE.
7. The method of any of the preceding clauses, further comprising:
    updating the at least one QCL relationship in response to receiving, from the receiving sidelink UE, a negative acknowledgment (NACK) for a message; and
    retransmitting the message with an updated at least one QCL relationship.

8. The method of any of the preceding clauses, further comprising: receiving measurement reports from the receiving sidelink UE when a dedicated link exists between the receiving sidelink UE and the transmitting sidelink UE; and determining the at least one QCL relationship based on the measurements.
9. The method of any of the preceding clauses, further comprising:
   informing the receiving sidelink UE that the transmitting sidelink UE has multiple TRPs;
   transmitting a first estimated QCL relationship; and
   transmitting a list of reference signals for each port to be measured,
   in which the measurements comprise a channel quality report based on the list of reference signals and the estimated QCL relationship.
10. The method of any of the preceding clauses, further comprising transmitting a radio resource control (RRC) connection update with a second QCL estimate when the measurements indicate the first estimated QCL relationship was incorrect.
11. The method of any of the preceding clauses, further comprising:
    receiving a report indicating the at least one QCL relationship is incorrect; and
    sending a radio resource control (RRC) connection update message with a modified QCL relationship.
12. A method of wireless communication by a receiving sidelink user equipment (UE), comprising:
    receiving a message from a plurality of transmission and reception points (TRPs) of a transmitting sidelink UE, the message indicating a quasi-co-location (QCL) assumption for the TRPs;
    measuring reference signals received from each transmission port of the plurality of TRPs, individually;
    determining whether signaling from the plurality of TRPs satisfies all conditions for the QCL assumption; and
    reporting to the transmitting sidelink UE a result of the determining.
13. The method of clause 12, further comprising reporting to the transmitting sidelink UE via a channel state indication (CSI) parameter, the parameter indicating groups of the plurality of TRPs that are not consistent with the QCL assumption.
14. The method of clause 12 or 13, in which the parameter indicates at least one reason why the groups are not consistent with the QCL assumption.
15. The method of any of the clauses 12-14, further comprising receiving a modified QCL assumption based on the reporting.
16. An apparatus for wireless communications by a transmitting sidelink user equipment (UE), comprising:
    at least one processor,
    memory coupled with the at least one processor; and
    instructions stored in the memory and operable, when executed by the at least one processor, to cause the apparatus:
      to determine at least one quasi-co-location (QCL) relationship between antenna ports of the transmitting sidelink UE, the at least one QCL relationship corresponding to carrier frequency offset (CFO), average delay, delay spread, Doppler shift, and/or Doppler spread across the antenna ports of the transmitting sidelink UE, each port mapping to a different transmission and reception point (TRP) of a plurality of TRPs; and
      to indicate the at least one QCL relationship to a receiving sidelink UE.
17. The apparatus of clause 16, in which the at least one processor causes the apparatus to indicate via sidelink control information (SCI).
18. The apparatus of clause 16 or 17, in which the at least one processor causes the apparatus to indicate during a radio resource control (RRC) connection setup or modification procedure for a sidelink communications link established between the receiving sidelink UE and the transmitting sidelink UE.
19. The apparatus of any of the clauses 16-18, in which the at least one processor causes the apparatus to determine the at least one QCL relationship based on preconfigured information about the plurality of TRPs.
20. The apparatus of any of the clauses 16-19, in which the at least one processor causes the apparatus to determine the at least one QCL relationship based on a velocity of the plurality of TRPs.
21. The apparatus of any of the clauses 16-20, in which the at least one processor causes the apparatus to determine the at least one QCL relationship based on sensor information and/or location information received from the receiving sidelink UE.
22. The apparatus of any of the clauses 16-21, in which the at least one processor causes the apparatus:
    to update the at least one QCL relationship in response to receiving, from the receiving sidelink UE, a negative acknowledgment (NACK) for a message; and
    to retransmit the message with an updated at least one QCL relationship.
23. The apparatus of any of the clauses 16-22, in which the at least one processor causes the apparatus:
    to receive measurement reports from the receiving sidelink UE when a dedicated link exists between the receiving sidelink UE and the transmitting sidelink UE; and
    to determine the at least one QCL relationship based on the measurements.
24. The apparatus of any of the clauses 16-23, in which the at least one processor causes the apparatus:
    to inform the receiving sidelink UE that the transmitting sidelink UE has multiple TRPs;
    to transmit a first estimated QCL relationship; and
    to transmit a list of reference signals for each port to be measured,
    in which the measurements comprise a channel quality report based on the list of reference signals and the estimated QCL relationship.
25. The apparatus of any of the clauses 16-24, in which the at least one processor causes the apparatus to transmit a radio resource control (RRC) connection update with a second QCL estimate when the measurements indicate the first estimated QCL relationship was incorrect.
26. The apparatus of any of the clauses 16-25, in which the at least one processor causes the apparatus:
    to receive a report indicating the at least one QCL relationship is incorrect; and
    to send a radio resource control (RRC) connection update message with a modified QCL relationship.
27. An apparatus for wireless communications by a receiving sidelink user equipment (UE), comprising:
    at least one processor, memory coupled with the at least one processor; and
instructions stored in the memory and operable, when executed by the at least one processor, to cause the apparatus:
to receive a message from a plurality of transmission and reception points (TRPs) of a transmitting sidelink UE, the message indicating a quasi-co-location (QCL) assumption for the TRPs;
to measure reference signals received from each transmission port of the plurality of TRPs, individually;
to determine whether signaling from the plurality of TRPs satisfies all conditions for the QCL assumption; and
to report to the transmitting sidelink UE a result of the determining.

28. The apparatus of clause 27, in which the at least one processor causes the apparatus to report to the transmitting sidelink UE via a channel state indication (CSI) parameter, the parameter indicating groups of the plurality of TRPs that are not consistent with the QCL assumption.

29. The apparatus of clause 27 or 28, in which the parameter indicates at least one reason why the groups are not consistent with the QCL assumption.

30. The apparatus of any of the clauses 27-29, in which the at least one processor causes the apparatus to receive a modified QCL assumption based on the reporting.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described and in Appendix A may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a transmitting sidelink user equipment (UE), comprising:
determining at least one quasi-co-location (QCL) relationship between antenna ports of the transmitting sidelink UE, the at least one QCL relationship corresponding to carrier frequency offset (CFO), average delay, delay spread, Doppler shift, and/or Doppler spread across the antenna ports of the transmitting sidelink UE, each antenna port mapping to a different transmission and reception point (TRP) of a plurality of TRPs at different locations of the transmitting sidelink UE; and
indicating the at least one QCL relationship to a receiving sidelink UE either via sidelink control information (SCI), or during a radio resource control (RRC) connection setup procedure for a sidelink communications link established between the receiving sidelink UE and the transmitting sidelink UE, or during an RRC modification procedure for the sidelink communications link established between the receiving sidelink UE and the transmitting sidelink UE.

2. The method of claim 1, further comprising determining the at least one QCL relationship based on preconfigured information about the plurality of TRPs.

3. The method of claim 1, further comprising determining the at least one QCL relationship based on a velocity of the plurality of TRPs.

4. The method of claim 1, further comprising determining the at least one QCL relationship based on sensor information and/or location information received from the receiving sidelink UE.

5. The method of claim 1, further comprising:
updating the at least one QCL relationship in response to receiving, from the receiving sidelink UE, a negative acknowledgment (NACK) for a message; and
retransmitting the message with an updated at least one QCL relationship.

6. The method of claim 1, further comprising:
receiving measurement reports from the receiving sidelink UE when a dedicated link exists between the receiving sidelink UE and the transmitting sidelink UE; and
determining the at least one QCL relationship based on the measurements.

7. The method of claim 6, further comprising:
informing the receiving sidelink UE that the transmitting sidelink UE has multiple TRPs;

transmitting a first estimated QCL relationship; and
transmitting a list of reference signals for each antenna port to be measured,
in which the measurements comprise a channel quality report based on the list of reference signals and the estimated QCL relationship.

8. The method of claim 7, further comprising transmitting a radio resource control (RRC) connection update with a second QCL estimate when the measurements indicate the first estimated QCL relationship was incorrect.

9. The method of claim 1, further comprising:
receiving a report indicating the at least one QCL relationship is incorrect; and
sending a radio resource control (RRC) connection update message with a modified QCL relationship.

10. A method of wireless communication by a receiving sidelink user equipment (UE), comprising:
receiving a message from a plurality of transmission and reception points (TRPs) of a transmitting sidelink UE, the message indicating a quasi-co-location (QCL) assumption for the TRPs, each TRP having a different location on the transmitting sidelink UE;
measuring reference signals received from each transmission port of the plurality of TRPs, individually;
determining whether signaling from the plurality of TRPs satisfies all conditions for the QCL assumption; and
reporting to the transmitting sidelink UE a result of the determining.

11. The method of claim 10, further comprising reporting to the transmitting sidelink UE via a channel state indication (CSI) parameter, the parameter indicating groups of the plurality of TRPs that are not consistent with the QCL assumption.

12. The method of claim 11, in which the parameter indicates at least one reason why the groups are not consistent with the QCL assumption.

13. The method of claim 10, further comprising receiving a modified QCL assumption based on the reporting.

14. An apparatus for wireless communications by a transmitting sidelink user equipment (UE), comprising:
at least one processor,
memory coupled with the at least one processor; and
instructions stored in the memory and operable, when executed by the at least one processor, to cause the apparatus:
to determine at least one quasi-co-location (QCL) relationship between antenna ports of the transmitting sidelink UE, the at least one QCL relationship corresponding to carrier frequency offset (CFO), average delay, delay spread, Doppler shift, and/or Doppler spread across the antenna ports of the transmitting sidelink UE, each antenna port mapping to a different transmission and reception point (TRP) of a plurality of TRPs at different locations of the transmitting sidelink UE; and
to indicate the at least one QCL relationship to a receiving sidelink UE either via sidelink control information (SCI), or during a radio resource control (RRC) connection setup procedure for a sidelink communications link established between the receiving sidelink UE and the transmitting sidelink UE, or during an RRC modification procedure for the sidelink communications link established between the receiving sidelink UE and the transmitting sidelink UE.

15. The apparatus of claim 14, in which the at least one processor causes the apparatus to determine the at least one QCL relationship based on preconfigured information about the plurality of TRPs.

16. The apparatus of claim 14, in which the at least one processor causes the apparatus to determine the at least one QCL relationship based on a velocity of the plurality of TRPs.

17. The apparatus of claim 14, in which the at least one processor causes the apparatus to determine the at least one QCL relationship based on sensor information and/or location information received from the receiving sidelink UE.

18. The apparatus of claim 14, in which the at least one processor causes the apparatus:
to update the at least one QCL relationship in response to receiving, from the receiving sidelink UE, a negative acknowledgment (NACK) for a message; and
to retransmit the message with an updated at least one QCL relationship.

19. The apparatus of claim 14, in which the at least one processor causes the apparatus:
to receive measurement reports from the receiving sidelink UE when a dedicated link exists between the receiving sidelink UE and the transmitting sidelink UE; and
to determine the at least one QCL relationship based on the measurements.

20. The apparatus of claim 19, in which the at least one processor causes the apparatus:
to inform the receiving sidelink UE that the transmitting sidelink UE has multiple TRPs;
to transmit a first estimated QCL relationship; and
to transmit a list of reference signals for each antenna port to be measured,
in which the measurements comprise a channel quality report based on the list of reference signals and the estimated QCL relationship.

21. The apparatus of claim 20, in which the at least one processor causes the apparatus to transmit a radio resource control (RRC) connection update with a second QCL estimate when the measurements indicate the first estimated QCL relationship was incorrect.

22. The apparatus of claim 14, in which the at least one processor causes the apparatus:
to receive a report indicating the at least one QCL relationship is incorrect; and
to send a radio resource control (RRC) connection update message with a modified QCL relationship.

23. An apparatus for wireless communications by a receiving sidelink user equipment (UE), comprising:
at least one processor,
memory coupled with the at least one processor; and
instructions stored in the memory and operable, when executed by the at least one processor, to cause the apparatus:
to receive a message from a plurality of transmission and reception points (TRPs) of a transmitting sidelink UE, the message indicating a quasi-co-location (QCL) assumption for the TRPs, each TRP having a different location on the transmitting sidelink UE;
to measure reference signals received from each transmission port of the plurality of TRPs, individually;
to determine whether signaling from the plurality of TRPs satisfies all conditions for the QCL assumption; and
to report to the transmitting sidelink UE a result of the determining.

24. The apparatus of claim 23, in which the at least one processor causes the apparatus to report to the transmitting sidelink UE via a channel state indication (CSI) parameter, the parameter indicating groups of the plurality of TRPs that are not consistent with the QCL assumption.

25. The apparatus of claim 24, in which the parameter indicates at least one reason why the groups are not consistent with the QCL assumption.

26. The apparatus of claim 23, in which the at least one processor causes the apparatus to receive a modified QCL assumption based on the reporting.

* * * * *